United States Patent
Liu

(10) Patent No.: US 11,604,600 B2
(45) Date of Patent: Mar. 14, 2023

(54) STAND-ALONE BRIDGING TEST METHOD

(71) Applicant: Silicon Motion, Inc., Jhubei (TW)

(72) Inventor: Tsai-Fa Liu, Jhubei (TW)

(73) Assignee: Silicon Motion, Inc., Jhubei (TW)

( * ) Notice: Subject to any disclaimer, the term of this patent is extended or adjusted under 35 U.S.C. 154(b) by 260 days.

(21) Appl. No.: 17/037,800

(22) Filed: Sep. 30, 2020

(65) Prior Publication Data

US 2021/0200459 A1    Jul. 1, 2021

(30) Foreign Application Priority Data

Dec. 26, 2019   (TW) .................................. 108147717

(51) Int. Cl.
  *G06F 3/06*   (2006.01)
  *G06F 13/42*   (2006.01)

(52) U.S. Cl.
  CPC .......... *G06F 3/0653* (2013.01); *G06F 3/0604* (2013.01); *G06F 3/0679* (2013.01); *G06F 13/42* (2013.01)

(58) Field of Classification Search
  CPC .... G06F 3/0653; G06F 3/0604; G06F 3/0679; G06F 13/42
  See application file for complete search history.

(56) References Cited

U.S. PATENT DOCUMENTS

| | | | |
|---|---|---|---|
| 6,198,663 B1 * | 3/2001 | Takizawa | G11C 29/16 714/E11.154 |
| 7,734,442 B2 | 6/2010 | Sedeh et al. | |
| 7,743,284 B1 | 6/2010 | Taylor et al. | |
| 7,873,885 B1 * | 1/2011 | Shin | G11C 29/08 714/724 |
| 8,527,815 B2 | 9/2013 | Whitt et al. | |
| 9,026,854 B2 | 5/2015 | Jeong et al. | |
| 2008/0263253 A1 | 10/2008 | Sedeh et al. | |
| 2017/0024139 A1 * | 1/2017 | Shim | G11C 29/808 |

FOREIGN PATENT DOCUMENTS

| | | |
|---|---|---|
| CN | 1862512 A | 11/2006 |
| CN | 101763300 B | 3/2012 |
| CN | 103136083 A | 6/2013 |
| CN | 104425041 A | 3/2015 |
| JP | 2017199445 A | 11/2017 |
| TW | 201137604 A | 11/2011 |
| TW | 201435364 A | 9/2014 |
| TW | 201832242 A | 9/2018 |

\* cited by examiner

*Primary Examiner* — David E Martinez

(57) ABSTRACT

A stand-alone bridging test method is provided, which is applied to a stand-alone bridging device. The stand-alone bridging device is coupled to a storage device. The stand-alone bridging device includes a bridging controller. The storage device includes a device controller and a device memory. The stand-alone bridging test method includes the bridging controller generates a handshaking test signal and transmits the handshaking test signal to the device controller. The device controller generates a confirmation test signal according to the handshaking test signal and transmits the confirmation test signal to the bridging controller. The bridging controller generates a test data according to the confirmation test signal and transmits a write command to the device controller to write the test data into the device memory. The bridging controller transmits a read command to the device controller to read a stored data of the device memory.

8 Claims, 4 Drawing Sheets

STAND-ALONE BRIDGING TEST METHOD

FIELD OF THE INVENTION

The present invention relates to a test method, and more particularly to a stand-alone bridging test method for performing read/write test capabilities on a storage device.

BACKGROUND OF THE INVENTION

At present, the industry performs a Burn-in Test on solid-state drives (SSDs), all of which need to communicate with a host computer and use an interface bridge as a communication interface for a conversion, for example, a conversion between a USB interface of the host computer and a SATA interface or a PCIE interface of the SSD. At this point, the host computer can execute the burn-in test on the SSD. Generally speaking, when the host computer executes the burn-in test, a test data is generated first, the test data is transmitted to the interface bridge through the USB interface, and then transmitted to the SSD through the SATA interface or the PCIE interface. Similarly, when the host computer needs to read data from the SSD, it needs to generate a read command, transmit the read command to the interface bridge through the USB interface, and then transmit the read command to the SSD through the SATA interface or the PCIE interface. When the SSD receives the read command, it transmits a received data to the interface bridge through the SATA interface or PCIE interface, and then to the host computer through the USB interface.

However, setting up the host computer not only increases a cost of the test, occupies a test space, but also increases a round-trip delay time. Therefore, how to directly provide the burn-in test on the SSD in an environment that does not require a computer host will be a focus to be solved in the art.

SUMMARY OF THE INVENTION

In view of this, embodiments of the present invention provide a stand-alone bridging test method, which is applied to a stand-alone bridging device. The stand-alone bridging device is coupled to a storage device, the stand-alone bridging device includes a bridging controller, and the storage device includes a device controller and a device memory coupled to the device controller. The stand-alone bridging test method includes: the bridging controller generating a handshaking test signal and transmitting the handshaking test signal to the device controller; the device controller generating a confirmation test signal according to the handshaking test signal and transmitting the confirmation test signal to the bridging controller; the bridging controller generating a test data according to the confirmation test signal and transmitting a write command to the device controller to write the test data into the device memory; and the bridging controller transmitting a read command to the device controller to read a stored data of the device memory.

In an embodiment of the present invention, the stand-alone bridging test method further includes: the bridging controller executing a data comparison according to the test data and the stored data to generate a test report, and storing the test report and an error log into the device memory of the storage device.

In an embodiment of the present invention, the stand-alone bridging device further includes a bridging memory, the bridging memory is coupled to the bridging controller and configured to store the test data, the test data is a random read/write data template or a continuous read/write data template.

In an embodiment of the present invention, the stand-alone bridging is coupled to a host communication interface of a host device, the step of the device controller generating the confirmation test signal according to the handshaking test signal and transmitting the confirmation test signal to the bridging controller further includes: the bridging controller determining whether to establish a communication link with the host device within a predetermined time; and if not, allowing the bridging controller to execute a test on the storage device.

In an embodiment of the present invention, the stand-alone bridging device further includes a bridging communication interface coupled to the bridging controller, the storage device further includes a device communication interface coupled to the device controller, the step of the bridging controller generating the test data according to the confirmation test signal and transmitting the write command to the device controller to write the test data into the device memory further includes: the bridging controller writing the test data into the device memory according to the write command through the bridging communication interface and the device communication interface.

In an embodiment of the present invention, the step of the bridging controller transmitting the read command to the device controller to read the stored data of the device memory further includes: the device controller transmitting the stored data to the stand-alone bridging device according to the read command through the device communication interface and the bridging communication interface.

The stand-alone bridging test method provided by the embodiments of the present invention directly establishes a communication link with the storage device by the bridging controller, and generates the test data by itself to perform the burn-in test on the storage device, so as to execute the burn-in test directly on the storage device in an environment that does not require a host computer. This not only greatly reduces the cost of the test and saves the test space, but also greatly reduces the round-trip delay time, i.e., the test time.

The above description is only an overview of the technical solution of the present invention. In order to understand the technical means of the present invention more clearly, it can be implemented according to the content of the specification. In order to make the above and other objects, features, and advantages of the present invention more comprehensible, embodiments are described below in detail with reference to the accompanying drawings, as follows.

DETAILED DESCRIPTION OF PREFERRED EMBODIMENTS

A stand-alone bridging test method provided by embodiments of the present invention can be applied to storage products such as SSDs or others that use non-volatile memories internally. The non-volatile memory may be, for example, a flash memory.

Figure 1:
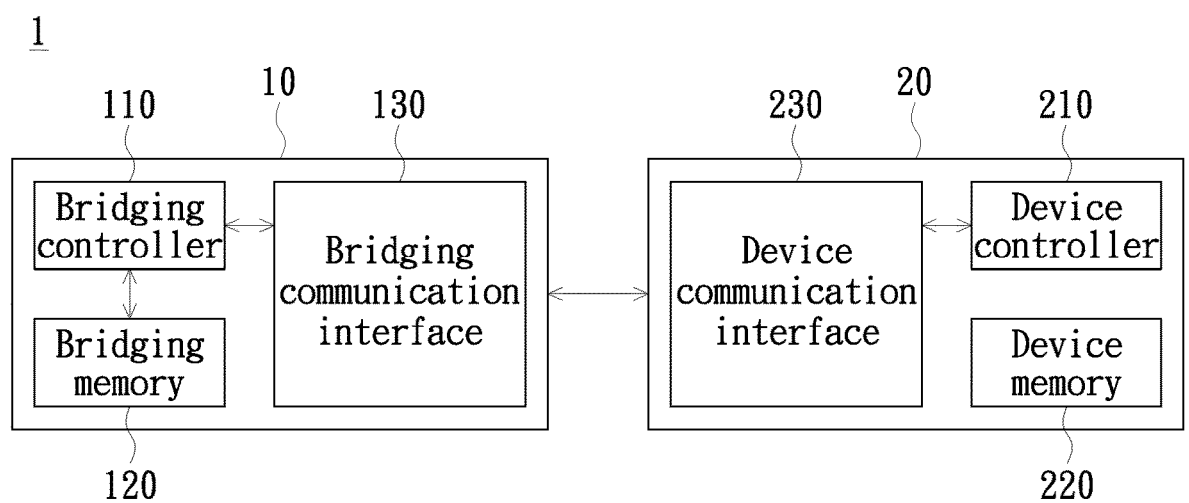
FIG. 1 is a system architecture schematic diagram of a stand-alone bridging test method provided by an embodiment of the present invention.

Please refer to FIG. 1, which is a system architecture schematic diagram of a stand-alone bridging test method provided by an embodiment of the present invention. The system architecture 1 of the stand-alone bridging test method includes a stand-alone bridging device 10 and a storage device 20, and the stand-alone bridging device 10 is coupled to the storage device 20. The stand-alone bridging device 10 includes a bridging controller 110, a bridging memory 120 and a bridging communication interface 130. The bridging controller 110 is coupled to the bridging memory 120 and the bridging communication interface 130. The storage device 20 includes a device controller 210, a device memory 220, and a device communication interface 230. The device controller 210 is coupled to the device memory 220 and the device communication interface 230. The bridging controller 110 mentioned herein may be a single-chip microcontroller, such as an 8051. The bridging memory 120 may be a volatile memory, such as a ROM. The bridging communication interface 130 may be a SATA transmission interface, a PCIE bus interface, or other interfaces which are capable of transmitting data. In addition, the device controller 210 may be a single-chip microcontroller, such as an SSD controller. The device memory 220 may be a non-volatile memory, such as a NAND Flash. The device communication interface 230 may be a communication interface, such as a SATA transmission interface or a PCIE bus interface.

Figure 2:
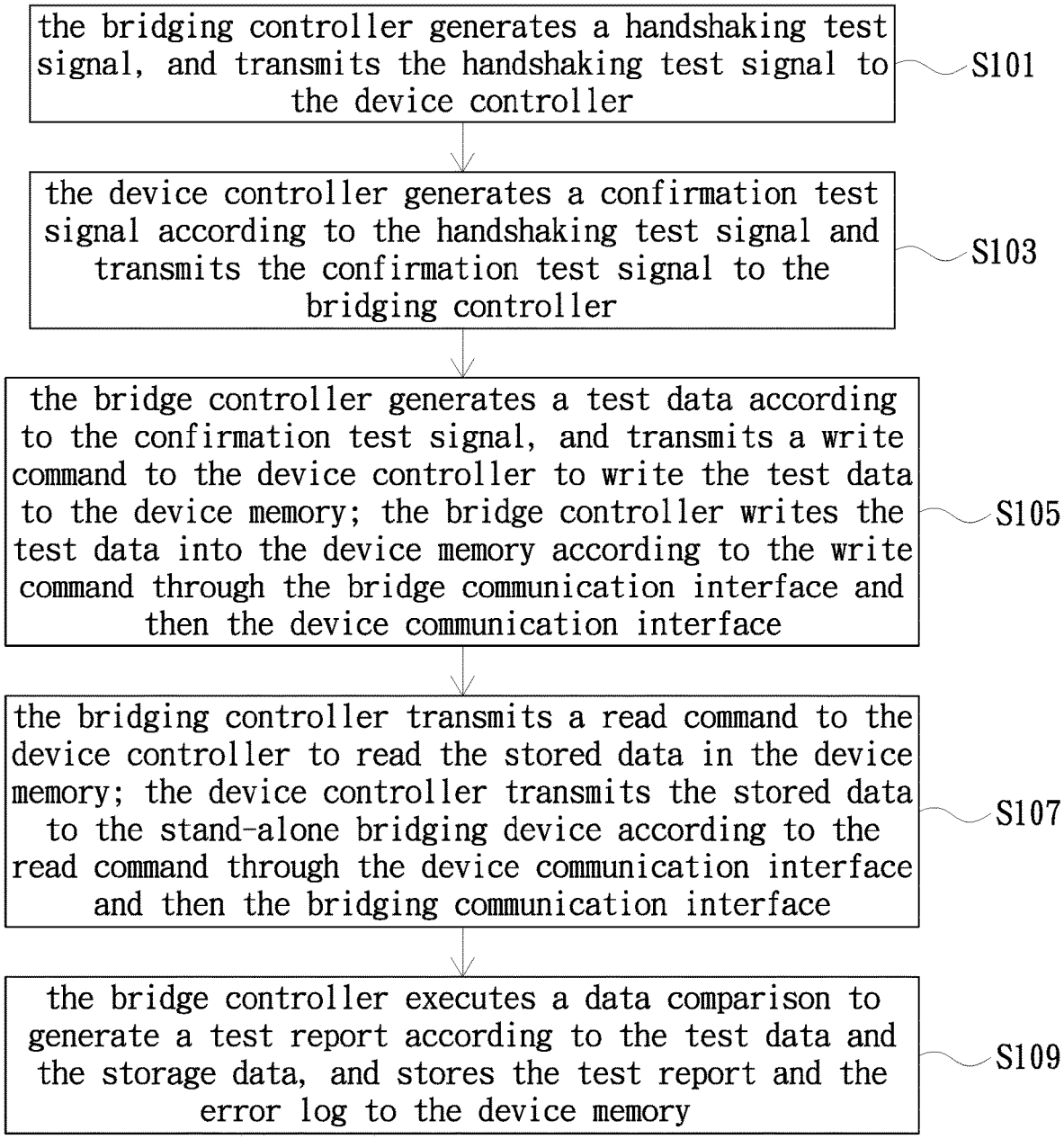
FIG. 2 is a flow chart of a stand-alone bridging test method provided by an embodiment of the present invention.

FIG. 2 is a flow chart of a stand-alone bridging test method provided by an embodiment of the present invention. The stand-alone bridging test method of the embodiment of the present invention includes following steps. In step S101, the bridging controller 110 generates a handshaking test signal, and transmits the handshaking test signal to the device controller 210 to make a request for establishing a communication link with the storage device 20.

Next, in step S103, the device controller 210 generates a confirmation test signal according to the handshaking test signal and transmits the confirmation test signal to the bridging controller 110, so as to establish a communication link between the stand-alone bridging device 10 and the storage device 20. The confirmation test signal mentioned herein includes confirmation of accepting the communication link requested by the independent bridge device 10 to provide a specification data of the device memory 220, such as the currently installed memory capacity.

Then, in step S105, the bridge controller 110 generates a test data by itself according to the confirmation test signal, and transmits a write command to the device controller 210 to write the test data to the device memory 220, so as to perform a write portion of the burn-in test. The test data mentioned herein may be read/write data templates, such as a random read/write data template or a continuous read/write data template, generated according to the specification data, such as a memory capacity, of the device memory 220. The test data may be stored to bridge memory 120. In addition, the step S105 further includes that the bridge controller 110 writes the test data into the device memory 220 according to the write command through the bridge communication interface 130 and then the device communication interface 230. Because the test data only needs to pass through two communication interfaces instead of three communication interfaces in a conventional system architecture. This greatly reduces a return-trip delay time, i.e., the test time.

Then, in step S107, the bridging controller 110 transmits a read command to the device controller 210 to read the stored data in the device memory 220, so as to perform a read portion of the burn-in test. The stored data mentioned herein is the test data written in the step S105. In addition, the step S107 further includes that the device controller 210 transmits the stored data in the device memory 220 to the stand-alone bridging device 10 according to the received read command through the device communication interface 230 and then the bridging communication interface 130. Because the test data only needs to pass through two communication interfaces instead of three communication interfaces in a conventional system architecture. This greatly reduces a return-trip delay time, i.e., the test time.

Then, in step S109, the bridge controller 110 executes a data comparison to generate a test report or checks an error log according to the test data and the received storage data, and stores the test report and the error log to the device memory 220 of the storage device 20 or other memories in the storage device 20, so as to execute a burn-in test directly on the storage device 20 in an environment that does not require a host computer. This not only greatly reduces the cost of the test and saves the test space, but also greatly reduces the round-trip delay time, i.e., the test time. In addition, if the device memory 220 has no defect at all, the stored data should be exactly equal to the test data written in the step S105, or the error log of the bridge controller 110 should not contain any errors. Conversely, if the device memory 220 has some defects, the stored data will not be exactly equal to the test data written in the step S105, or there will be any errors in the error log of the bridge controller 110. In addition, the test report mentioned herein will actually reflect a defect degree of the device memory 220.

Figure 3:
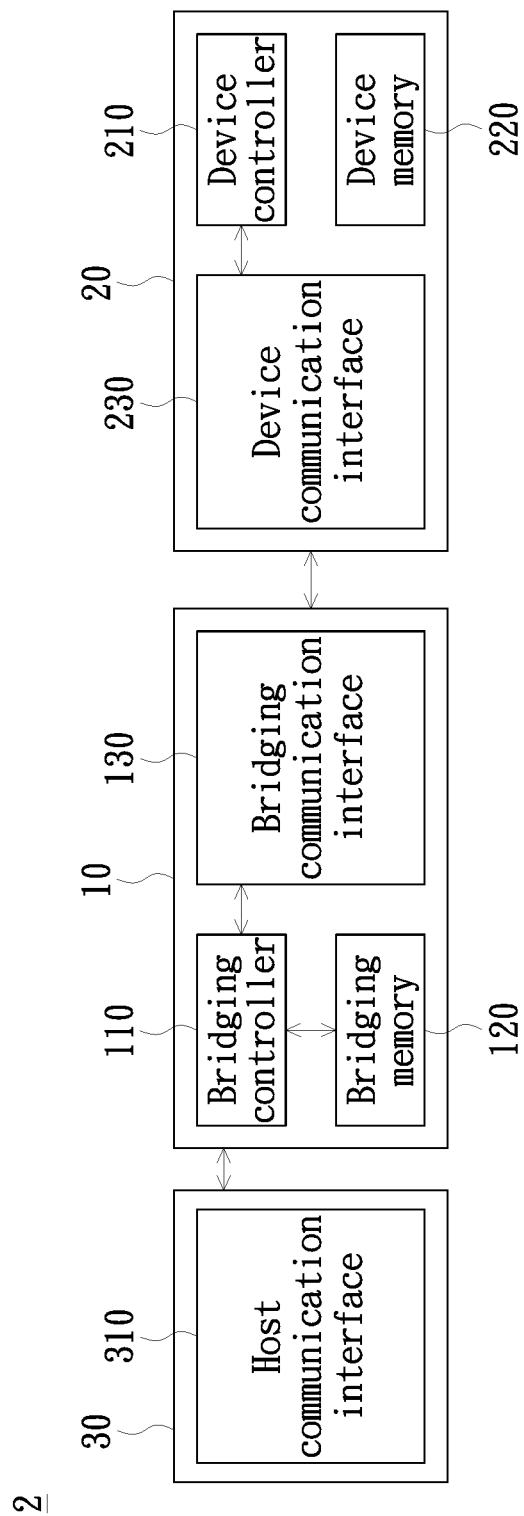
FIG. 3 is a system architecture schematic diagram of a stand-alone bridging test method provided by another embodiment of the present invention.

FIG. 3 is a system architecture schematic diagram of a stand-alone bridging test method provided by another embodiment of the present invention. It should be noted that the system architecture 2 of the stand-alone bridging test method is a system architecture extended from the system architecture 1 of the stand-alone bridging test method. Relevant descriptions of the system architecture and test method have been described in detail in the foregoing embodiments, and are not repeated herein, but overview in brief. The system architecture 2 of the stand-alone bridging test method includes a stand-alone bridging device 10, a storage device 20, and a host device 30, and the stand-alone bridging device 10 is coupled to the storage device 20 and the host device 30. The host device includes a host communication interface 310, and the host communication interface 310 is coupled to the stand-alone bridging device 10. The host device 30 mentioned herein may be an electronic product, such as a computer, having a burn-in test capability and a communication link capability.

Figure 4:
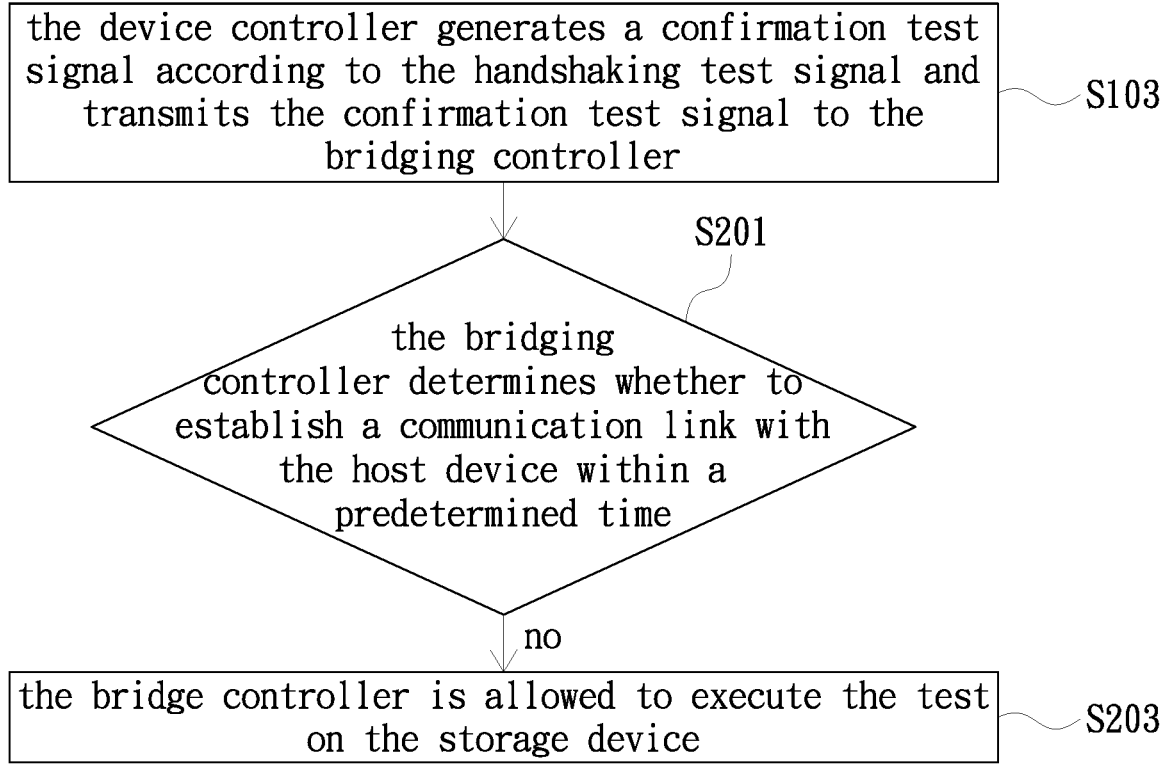
FIG. 4 is a flow chart of a stand-alone bridging test method provided by another embodiment of the present invention.

FIG. 4 is a flow chart of a stand-alone bridging test method provided by another embodiment of the present invention. After the step S103, step S201 is further included. In the step S201, the bridging controller 110 determines whether to establish a communication link with the host device 30 within a predetermined time. The predetermined time mentioned herein may be, for example, a short time such as 30 seconds, 60 seconds, or 90 seconds. Then, in step S203, if not (for example, the bridging controller 110 does not establish the communication link with the host device 30), the bridge controller 110 is allowed to execute the burn-in test on the storage device 20. The burn-in test mentioned herein is step S105 to step S109 described in detail in the foregoing embodiment, and is not repeated herein.

In summary, the stand-alone bridging test method provided by the embodiments of the present invention directly establishes a communication link with the storage device by the bridging controller, and generates the test data by itself to perform the burn-in test on the storage device, so as to execute the burn-in test directly on the storage device in an environment that does not require a host computer. This not only greatly reduces the cost of the test and saves the test space, but also greatly reduces the round-trip delay time, i.e., the test time.

Although the present invention has been disclosed as above with the embodiments, it is not intended to limit the present invention. Those ordinarily skilled in the art may make some modifications and retouching without departing from the spirit and scope of the present invention. Therefore, the protection scope of the present invention shall be determined by the scope of the attached claims.

What is claimed is:

1. A stand-alone bridging test method, applied to a stand-alone bridging device, wherein the stand-alone bridging device is coupled to a storage device, the stand-alone bridging device includes a bridging controller, the storage device includes a device controller and a device memory coupled to the device controller, the stand-alone bridging test method comprises:
    the bridging controller generating a handshaking test signal and transmitting the handshaking test signal to the device controller;
    the device controller generating a confirmation test signal according to the handshaking test signal and transmitting the confirmation test signal to the bridging controller;
    the bridging controller generating a test data according to the confirmation test signal and transmitting a write command to the device controller to write the test data into the device memory; and
    the bridging controller transmitting a read command to the device controller to read a stored data of the device memory.

2. The stand-alone bridging test method as claimed in claim 1, further comprising:
    the bridging controller executing a data comparison according to the test data and the stored data to generate a test report, and storing the test report and an error log into the device memory of the storage device.

3. The stand-alone bridging test method as claimed in claim 1, wherein the stand-alone bridging device further includes a bridging memory, the bridging memory is coupled to the bridging controller and configured to store the test data, the test data is a random read/write data template or a continuous read/write data template.

4. The stand-alone bridging test method as claimed in claim 1, wherein the confirmation test signal includes a specification data of the device memory.

5. The stand-alone bridging test method as claimed in claim 1, wherein the stand-alone bridging is coupled to a host communication interface of a host device, the step of the device controller generating the confirmation test signal according to the handshaking test signal and transmitting the confirmation test signal to the bridging controller further includes:
    the bridging controller determining whether to establish a communication link with the host device within a predetermined time; and
    if not, allowing the bridging controller to execute a test on the storage device.

6. The stand-alone bridging test method as claimed in claim 1, wherein the stand-alone bridging device further includes a bridging communication interface coupled to the bridging controller, the storage device further includes a device communication interface coupled to the device controller, the step of the bridging controller generating the test data according to the confirmation test signal and transmitting the write command to the device controller to write the test data into the device memory further includes:
    the bridging controller writing the test data into the device memory according to the write command through the bridging communication interface and the device communication interface.

7. The stand-alone bridging test method as claimed in claim 6, wherein the step of the bridging controller transmitting the read command to the device controller to read the stored data of the device memory further includes:
    the device controller transmitting the stored data to the stand-alone bridging device according to the read command through the device communication interface and the bridging communication interface.

8. The stand-alone bridging test method as claimed in claim 6, wherein the bridging communication interface is a SATA transmission interface or a PCIE bus interface, and the device communication interface is a SATA transmission interface or a PCIE bus interface.

* * * * *